Dec. 2, 1958 J. D. MARKS 2,862,716

TONE ARM FOR SOUND REPRODUCTION

Filed Nov. 13, 1953 4 Sheets-Sheet 1

INVENTOR
Joseph David Marks
BY
ATTORNEY

Dec. 2, 1958 J. D. MARKS 2,862,716

TONE ARM FOR SOUND REPRODUCTION

Filed Nov. 13, 1953 4 Sheets-Sheet 2

INVENTOR
Joseph David Marks
BY
Day Morse
his ATTORNEY

Dec. 2, 1958 J. D. MARKS 2,862,716

TONE ARM FOR SOUND REPRODUCTION

Filed Nov. 13, 1953 4 Sheets-Sheet 3

INVENTOR
Joseph David Marks
BY
[signature]
ATTORNEY

Dec. 2, 1958 J. D. MARKS 2,862,716

TONE ARM FOR SOUND REPRODUCTION

Filed Nov. 13, 1953 4 Sheets-Sheet 4

INVENTOR

Joseph David Marks

BY

His ATTORNEY 2,862,716
Patented Dec. 2, 1958

2,862,716

TONE ARM FOR SOUND REPRODUCTION

Joseph David Marks, West Orange, N. J.

Application November 13, 1953, Serial No. 391,971
12 Claims. (Cl. 274—23)

This invention relates to sound reproducing apparatus and, more particularly, to an improved mounting for one or more stylus carrying pick-ups arranged to maintain the stylus oscillation axis in tangential relation to the spiral sound track or groove of a record throughout the range of movement of the pick-up or pick-ups across the record.

In the art of reproducing music or sound which has been recorded on phonograph discs, or records, the commonly employed means is a transducer actuated by a stylus which engages the minute grooves impressed in the surface of the record, the tiny undulations in these grooves imparting relatively rapid sidewise motions to the stylus causing the transducer to generate electrical impulses of wave shape corresponding to the motions of the stylus. These impulses may be amplified and employed to reproduce the original sound through a loud-speaking device. The grooves form a continuous spiral, usually from the outside of the disc toward the center; and the undulations representing the impressed sound consist of sidewise deviations of the groove toward and away from the center about which the disc is rotating. Thus, in addition to the stylus responding to the sound pattern in the grooves, the entire transducer assembly must make a relatively slow excursion across the face of the revolving disc as the stylus traces out the complete spiral in the record. In the art as commonly practiced for monaural reproduction, the stylus and transducer assembly, collectively termed the "pickup," is usually rigidly mounted to the end of a rigid arm, termed the "tone-arm," the latter being freely pivoted about some point outside the area of the record so as to permit lateral movement of the pickup across the record. In so doing, the stylus describes an arc about the arm pivot.

It is well established in the art that a pickup mounted in the above fashion cannot truly reproduce the original sound impressed in the record, because the axis about which the stylus makes its instantaneous lateral movements is not tangent to the groove at all positions of the pickup in its excursion across the record; whereas the undulations impressed in the (original) record are cut by a device so mounted and moved across the record as to have its cutter axis at all times tangent to the groove at its instant position. For a reproducing pickup mounted in the usual manner, therefore, there can be but one position on the record at which the pickup axis is tangent to the groove, and at all other positions a greater or lesser amount of distortion is introduced due to the departure from the desired tangential position of contact with the groove. This is in the nature of harmonic distortion.

In a more recently developed art, sound is recorded binaurally on records, employing two separate bands of grooves, one occupying substantially the outer usable half of the record and the other occupying the inner usable half. These two bands are cut simultaneously by two cutters, both moved across the record in unison with their axes at all times tangent to their respective grooves, and with their cutting styli at all times in a single radial line and a fixed distance apart. These records are reproduced by engaging two pickups with these respective bands of grooves, the reproductions being, of course, separately amplified and played through disparate loud speakers.

It is requisite in playing back, or reproducing, these binaural records, that each pickup not only maintain its axis tangent to the respective grooves at its instantaneous positions, for the same reasons as in the case of monaural reproduction described above, but further that both pickup styli remain in a single radial line at any instantaneous position in their joint excursion across the record, and also remain a fixed distance apart. If the styli are permitted to depart from a single radial line at any instant position, one stylus may then be thought of as either leading or lagging the other, i. e. one stylus will be responding to an element of sound recorded a small time before or after the element of sound to which the other stylus is at that instant responding, whereas correspondent sounds in the two bands are originally recorded on a single radial line at any instant. The above condition introduces binaural phase distortion, in proportion to the amount of departure of the two styli from a single radial line at any instant.

In the conventionally constructed monaural tone arm, the pickup is rigidly mounted at the end of the rigid arm with the axis of the pickup at a fixed angle to the arm proper. This is a compromise angle selected to give the best average approach to the proper (tangential) relationship of the pickup axis to the record grooves. This construction is usually referred to as "offset head."

In the present state of the binaural art, two pickups are rigidly mounted the proper distance apart at the end of a rigid arm in a similar fashion to the monaural arm described above, and similarly pivoted to permit lateral excursion of the two pickups jointly across the record. Each stylus describes an arc about the common arm pivot in its excursion across the record. As in the monaural case, the pickups so mounted can have their axes in tangential contact with their respective grooves at only one position on the record, and at all other positions a greater or lesser amount of harmonic distortion will be introduced by both pickups. Further, the styli of the pickups so mounted can be in a single radial line at only one position on the record, and at all other positions will depart from a single radial line, thus introducing a greater or lesser amount of binaural phase distortion.

There are certain physical or mechanical limitations on the means which may be used to achieve a continuous tangential relation of the stylus axis to the record groove. As the force employed to cause the tone arm to rotate about its lateral pivot, and hence permit the pickup to make a complete excursion across the record, must come from the walls of the record groove via the stylus, and at the same time must not interfere with the free response of the stylus to the groove deviations which represent the impressed sound, the lateral pivot of the tone arm must present the minimum constraint to rotation and hence the minimum reaction of the stylus against the walls of the groove. It is equally important that any mechanism intended to continuously correct the tangency of the pickup axis, if actuated by the lateral force imparted by the groove to the stylus as in the conventional case, must likewise cause no greater order of lateral loading of the stylus than has proven permissible in present practice. These considerations rule out sliding surfaces, cams, belts, gears, etc. and leave only rotating pivots worthy of consideration.

In conventional practice freedom of vertical movement of the pickup may be provided in the form of a vertical pivoting of the tone arm or may be provided in the mounting of the pickup to the tone arm. The same means may be employed in the practical forms of the present invention. Where rigid mounting of the pickup to the tone arm is referred to herein, this means, in the plan view, no gross change in the angular position of the pickup with respect to the tone arm is permitted, but does not preclude the use of vertical pivoting. Likewise, in the references to the present practice in binaural arms, such vertical pivoting may be inferred. In binaural arms, a certain amount of lateral compliance is also employed in the mounting of the pickups to provide for certain practical record inequalities. The same means may be employed in the practical forms of the present invention. In a further reference hereinafter, it will be shown that the present invention has an incidental characteristic of eliminating one source of the necessity for this lateral compliance.

It is an object of this invention to provide a tone arm, or mounting, by means of which a conventional pickup will be moved across a monaural record in such fashion as to always have the pickup axis in tangential contact with the groove at any instantaneous position.

It is a further object of this invention to provide a tone arm, or mounting, by means of which two conventional pickups will be moved across a binaural record in such fashion as to always have the axes of both pickups in tangential contact with their respective grooves at any instantaneous position.

It is a still further object of this invention to provide a tone arm, or mounting, by means of which two conventional pickups will be moved across a binaural record in such fashion as to always have their styli in a single radial line at any instantaneous position.

It is a still further object of this invention to provide a tone arm, or mounting, having the aforementioned desired characteristics of a binaural tone arm, and capable of playing a monaural record by employing the pickup mounted on the inner position of the tone arm, the pickup being moved across a monaural record in such fashion as to always have its axis in tangential contact with the groove at any instantaneous position.

A feature of the present invention is that only rotating pivots are employed, and only the minimum possible number of these necessary to achieve the objects of the invention. By well known mechanical art, such as cone pivots, the order of rotating friction may be held comparable with that experienced in conventional practice.

More specifically, the invention arrangement includes a tone arm pivotally supported at an arbitarary point outside the record to swing in a plane parallel to the record surface. One or more pickups are pivotally mounted on the free end of this tone arm for controlled swinging movement in a plane parallel to the record surface, the pivot point, in a monaural pickup, being preferably at the point of engagement of the stylus with the record groove, and, in a multi-channel pickup, being preferably at a point midway between the points of engagement of the styli with the record grooves.

In accordance with the invention, a pickup control link is pivotally supported at a point outside the record, spaced from the pivotal support of the tone arm and located as hereafter described, to swing in a plane parallel to the record surface. The control link is pivotally connected to the pickup, or pickup assembly comprising two or more fixedly related pickups, at a point spaced an arbitrary distance from the pivotal mounting of the pickup assembly to the free end of the tone arm along a line which is tangent to the sound track at any instant at the point directly under the pivot point of the pickup assembly to the tone arm at that instant.

The length of the tone arm and the distance between the two pivot points on the pickup assembly having been arbitrarily chosen, the location of the pivotal support of the control link outside the record is found by marking at equal distances from the arc of traverse of the lower pivot (tone arm to pickup assembly), a fixed point on the tangent to the record groove at each of three arbitary positions along this arc, these points being at a distance from the arc equal to the distance between pivots previously chosen. The three points thus found lie on the arc of a circle, whose center can be geometrically determined. This center is the pivotal mounting point of the control link, and its radius is the effective length of the control link between its pivotal mounting and its pivotal connection to the pickup assembly. With this arrangement, and within the area of the sound track, the control link maintains the stylus axis tangent to the sound track with an error several orders less in magnitude than any feasible manufacturing tolerances.

For an understanding of the invention principles, reference is made to the following description of typical embodiments thereof as illustrated in the accompanying drawings. In the drawings.

Figure 1:
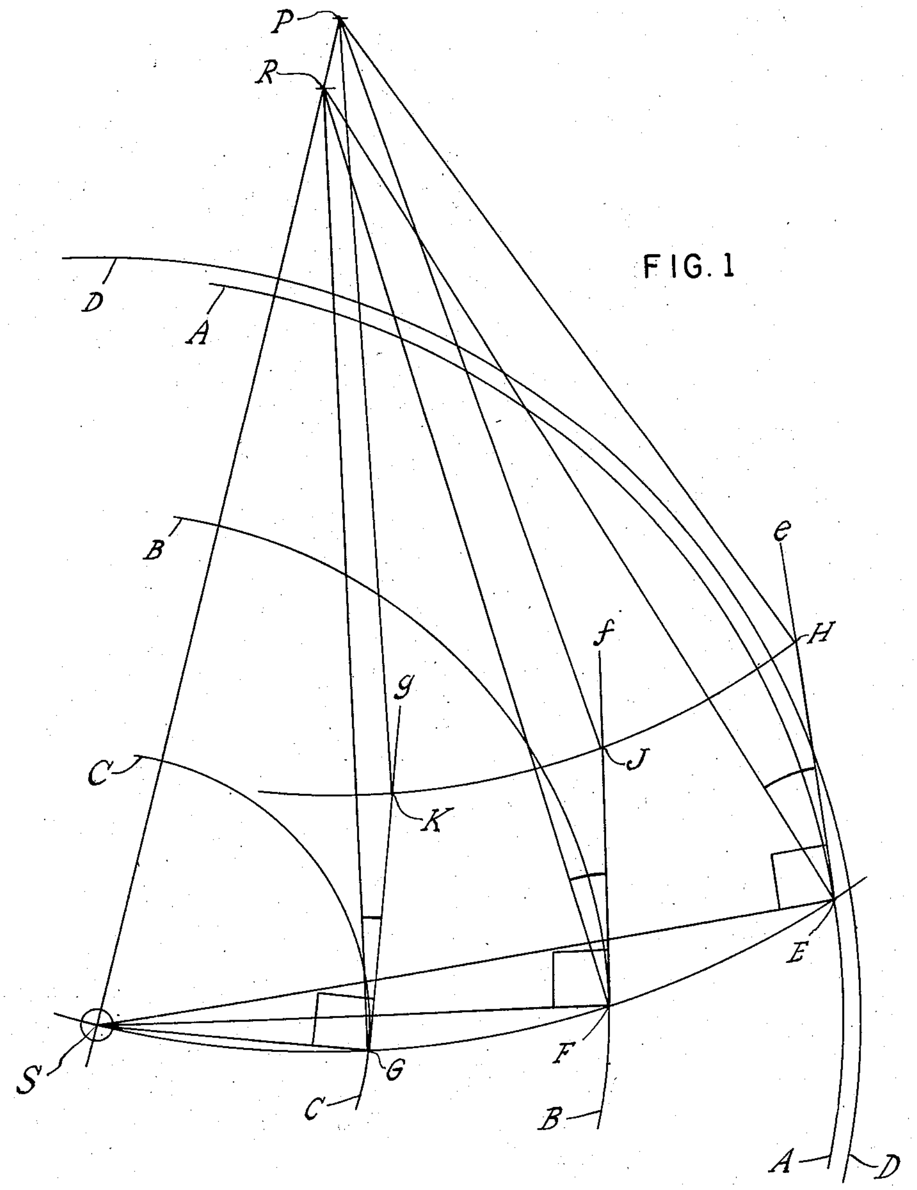
Fig. 1 is a diagrammatic plan view of the invention arrangement, as applied to a monaural pickup, illustrating the geometrical relations involved.

Figure 1 illustrates the geometric development of the linkage. Let S represent the spindle center of a record, having as its boundary the arc D—D. Let R be a conveniently chosen pivot center, outside the edge of the record, for lateral rotation of the member termed the "arm." Let the pickup be affixed to the arm so that the stylus is at a distance RS from the pivot R, and so that the pickup may rotate about a pivot at the same point as the stylus. Now let arcs A—A, B—B and C—C represent grooves near the outer edge, near the middle and near the inner end of the entire sound track, respectively. If now the arm be rotated about pivot R so as to carry the stylus across the record, the arc EFGS being produced, the stylus will successively intersect the arcs A—A, B—B and C—C at points E, F and G, and the arm will successively occupy the positions RE, RF and RG. It is desired that the axis of the pickup, when the stylus is at points E, F and G, be tangent to each of the grooves A—A, B—B and C—C. Construct tangents to the arcs A—A, B—B and C—C at points E, F and G, the tangents E—*e*, F—*f* and G—*g*, being at right angles to the radial lines SE, SF and SG respectively. It is seen that the angle between these tangents and the respective positions of the arm as the stylus moves inward is gradually changing, i. e., the angle RE*e* is greater than the angle RF*f* which is greater than the angle RG*g*. If the axis of the pickup has a fixed angular relation to the arm, this angle can only permit tangency of the axis to the groove at one position of the arm. Hence it is evident the axis of the pickup must be caused to rotate progressively about the stylus point as the arm moves the stylus inward across the record. Now choose a convenient length along the axis of the pickup and mark this distance from the locus of the stylus along the constructed tangents at each of the positions shown, i. e. EH=FJ and FJ=GK. It will be noted that the three points H, J and K lie on the arc of a circle, and by the well known methods of geometry the center of this circle may be located. Let this point be called P. If now a member termed the "control link" be pivoted about point P and connected pivotally to the control point (H, J, K) on the pickup axis, the control link will successively occupy the positions PH, PJ and PK for the corresponding positions of the pickup axis EH, FJ and GK. It is seen that this is sufficient to assure the positioning of the pickup axis on the constructed tangent lines, i. e. the pickup axis will progressively be made tangent to the grooves at the instantaneous position of the stylus, as the stylus moves inward across the record.

In the foregoing construction, the intersection with three random grooves was given, and the points H, J and K found for these three intersections. The three points, of course, determine a circle, with the center P. Suppose a plurality of additional intersections with arcs between A—A and C—C be given, and the corresponding points between H and K be constructed as above. It may be questioned whether the curve connecting all the points so constructed between H and K be an arc of a circle, with center P. It has been found that, for the practical case, i. e. for no grooves outside the record boundary D—D, and for all grooves from the boundary to the spindle S, all such points lie on the circle HJK with center P, within an error several orders of magnitude less than any feasible tolerances of manufacture. Only for the absurd case of the stylus path produced outside the record to intersect an imaginary arc so large as to include the points P and R within it, and with the control link swung to a position at right angles to the line PS in the figure, does the path of the control points produced outward begin to sensibly depart from a circle. The angle of excursion required of the linkage in any practical case, i. e. the angle HPK for the control link and the angle ERG for the arm (or HPS and ERS) is inherently limited to the range within which the locus of the path of the control point is indistinguishable from a circular arc. In a typical embodiment of the invention, the constraint of this path to a circular arc by the control link causes a maximum theoretical departure from true tangency of less than 1/100 of a degree of arc. As has been stated, this is far less than any feasible tolerances of manufacture for the component parts, including the pickup itself. Hence for all practical purposes this invention produces true and continuous tangential contact of the pickup axis with the record groove. This is not approached by any fixed offset head of the prior art. In such typical embodiment, with suitable dimensions chosen for the arm RS, and the pickup axis EH, the dimension for control link PH is determined and the locus of point P is also determined. The optimum location for the point P is found to lie on the lines SR extended.

Using the linkage as illustrated in Figure 1 as a basis, a suitable tone arm may be designed for mounting a conventional pickup for the playing of monaurally recorded records. The pickup will be pivotally connected to the arm at a point directly in a vertical line with the pickup stylus, and pivotally connected to the control link at a convenient point on the pickup axis. The arm and the control link will be pivotally mounted to a suitable support at the points corresponding to R and P, and the support fixed to the turntable mounting board. The four pivots described are arranged to permit free rotation for each of the members in a lateral plane, i. e. a plane parallel to the surface of the record, but constrained in all other directions of motion. As elsewhere mentioned, vertical pivoting such as is required for handling and pickup requirements may conventionally be provided in the tone arm support or the mounting details of the pickup, but are not incorporated in the four lateral pivots described above. Obviously the mechanical details of design may vary widely within the scope of the present invention, and all such variations are contemplated in the present invention.

Although the linkage as shown and described has the arc path of the stylus passing through the spindle center S, and the pivot of the arm to the pickup at the same point as the stylus, and whereas this is the preferred geometry, the invention is not limited to this configuration, but includes arms of any length having the arc path not passing through the spindle center S, and also may have the pivot of the arm to the pickup at points other than the same point as the stylus. The preferred location of the stylus at the pivot point of the pickup to the arms serves to eliminate any turning moment being developed about this pivot point due to the lateral force at the stylus which traverses the tone arm across the record, i. e. the centripetal force derived from the spiralling of the groove. Such moment is mechanically undesirable for the pickup itself, but, as stated, the integrity of the linkage for producing the desired tangency is nevertheless preserved if such other configuration be used.

Figure 2:
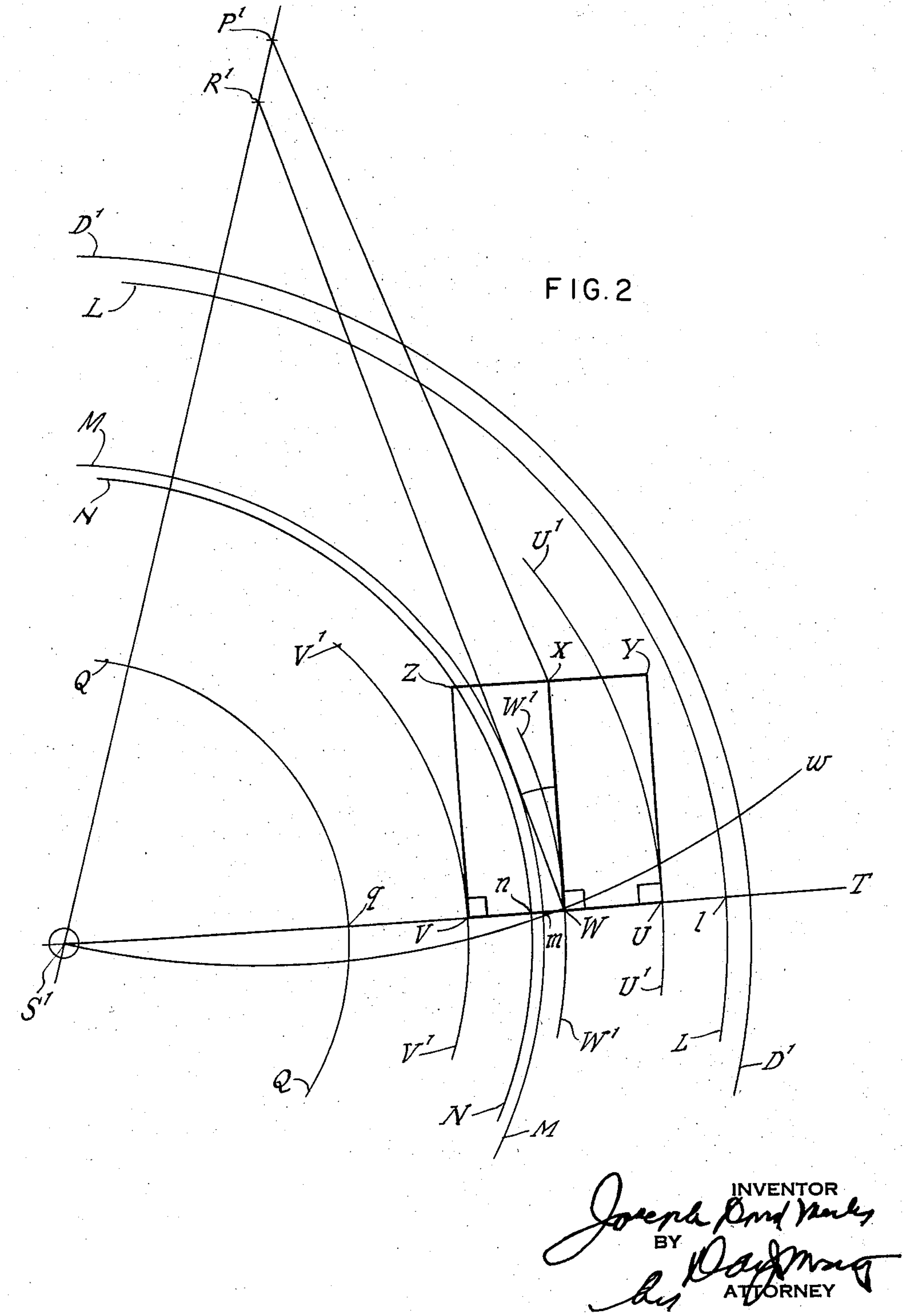
Figs. 2 and 3 are views, similar to Fig. 1, illustrating the geometry of a binaural pickup assembly.

Fig. 2 illustrates the geometry for the binaural case. In one established system for binaural recording, the two sound tracks are placed in two concentric bands on the record, the first occupying the outer usable region of the record and consisting of a single continuous spiral groove exactly as in conventional recording, and the second track identically constructed but starting inward a short distance after the first sound track stops, and thence occupying the inner usable region of the record. The first element of sound on each track is recorded on the first groove of each band on a single radial line on one side of the spindle center; and since the record as a whole rotates, each successive pair of corresponding elements of sound are also at any instant on a single radial line, continuing thus inward to the last pair of corresponding elements on the respective innermost grooves of each band. As the cutters originally are maintained a fixed distance apart in their excursion across the record during recording, each corresponding groove and hence each element of sound of a corresponding binaural pair are always a fixed nominal distance apart on a radial line. This nominal distance is, of course, a basic module, characteristic of the system of recording.

Thus, in Fig. 2, S′ represents the spindle center of a record having as its boundary the arc D′—D′. Arcs L—L and N—N represent respectively the initial grooves of the outer and inner bands, and arcs M—M and Q—Q represent respectively the terminal grooves of the outer and inner bands. Let S′T be any radial line, intersecting arcs L—L, M—M, N—N and Q—Q at *l, m, n* and *q* respectively. Let U and V be any corresponding pair of outer and inner elements of sound on line S′T, at the intersections with grooves U′—U′ and V′—V′ respectively. The distances *ln, mq* and UV are all equal and are the module of the system of recording. It is desired that the styli of the two pickups employed be over the points U and V, and that the axis of each pickup be tangent to the grooves U′—U′ and V′—V′ at the points U and V respectively. Let W be a point on line S′T half way between U and V, i. e. UW=WV=half the module. W′—W′ is a portion of the groove arc at this point. Now construct the arm R′W such that R′W equals R′S′, the tangent WX to arc W′—W′ at point W, and the control link P′X, all as described in connection with Figure 1. R′, P′, W and X are laterally pivoted, and the system R′P′XW is identical to the linkage developed in Figure 1.

Now, if a pickup were mounted on line WX, with the stylus at W, the linkage R′P′XW would constrain it to move so that WX were always tangent to the groove at point W at any instant position, that is, identical to the monaural case as in Figure 1. Instead of placing a pickup on WX, however, construct tangents UY and VZ such that UY and VZ=WX, and connect points Y and Z to point X. UVZY is seen to be a rectangle, and UY and VZ are equal in length to WX, parallel thereto, and equidistant therefrom. If pickups are placed on lines UY and VZ with their styli on points U and V respectively, it is seen that, for the position shown, the styli are at the proper points for a pair of corresponding sound elements and their axes are tangent to the groove arcs at those points.

Let the rectangle UVZY be a rigid, non-deformable rectangle pivotally connected to the arm R′W at the point W and to the control link P'X at the point X, as previously, freely rotatable in the lateral plane only. If now the linkage be traversed across the record, outwardly or inwardly, it is seen that the point W will describe an arc S'W*w*, and the line WX will always be tangent to the instantaneous groove at any instant position of the point W. This is identical with the case described in Figure 1. As the linkage so moves, the line WX continuously rotates about the point W as required, i. e. the angle R'WX constantly changes, to maintain the tangency as previously described. Since the rectangle UVZY is a rigid rectangle rigidly mounted to the line WX, the rectangle as a whole rotates continuously around the point W in the same manner as the line WX. At any instant position of the point W, the lines UY and VZ remain parallel to and equidistant from the line WX. Since the line WX is always tangent to the groove at the point W, the lines UY and VZ must always remain tangent to the grooves at their respective instantaneous positions at the points U and V respectively, and the points U and V must always be on the same radial line at any instant as the point W, i. e. on any instant position of the radial line S'W. The distance between points U and V also, of course, remains fixed throughout the excursion described.

On the linkage as illustrated in Figure 2, and described in detail above, a suitable tone arm may be designed for mounting two conventional pickups for the playing of binaurally recorded records. The two pickups will be mounted to a mounting member with their styli a fixed distance apart as required by the module of the recording system and their axes parallel. The mounting member will be pivotally connected to the arm at a point midway on a line between the two styli, and pivotally connected to the control link at a convenient point on a line at right angle to the line between the two styli at the midpoint thereof. The arm and control link will be pivotally mounted to a suitable support at the points corresponding to R' and P', and the support fixed to the turntable mounting board. The four pivots described are arranged to permit free rotation for each of the members in a lateral plane, i. e. a plane parallel to the surface of the record but constrained in all other directions of motion. The two pickups will be fixed in their relation to the line joining the two pivots on the mounting member, i. e. always parallel thereto and equidistant therefrom. As elsewhere mentioned, vertical pivoting, such as is required for handling and pickup requirements, may conventionally be provided in the tone arm support or the mounting details of the two pickups, but are not incorporated in the four lateral pivots described above. A certain limited amount of viscous lateral compliance that may be required between the pickups due to the exigencies of binaural record manufacture is likewise not incorporated in the linkage as described, being extraneous to the invention. If required, this may conventionally be provided for in the pickup design or in the details of mounting of each pickup to the mounting member. Obviously the mechanical details of design may vary widely within the scope of the present invention.

Figure 3:
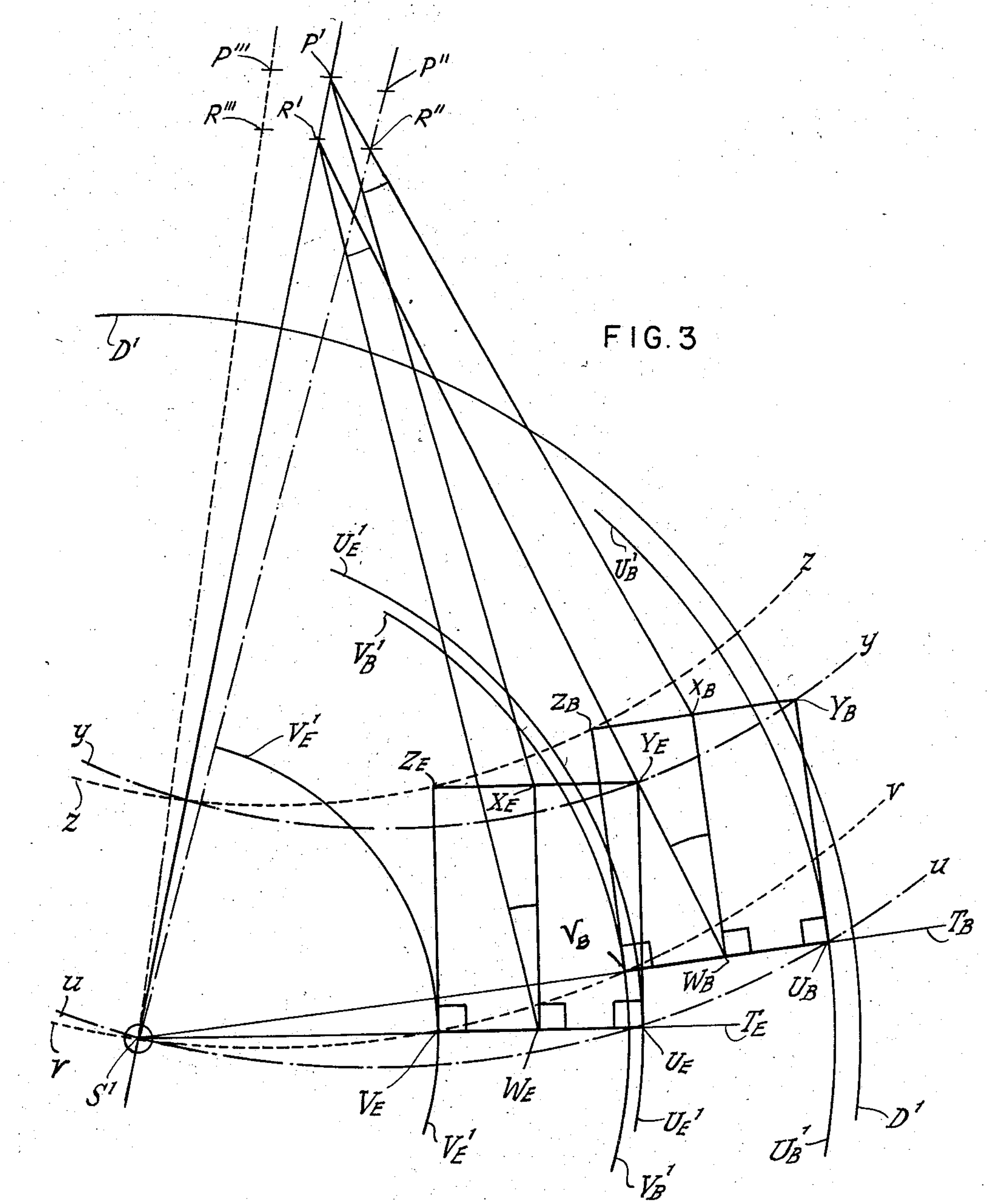

Fig. 3 illustrates, for clarification, the configurations for two positions of the binaural case; one showing the two pickups engaging corresponding grooves near the beginning of the two bands, and the other showing the two pickups engaging corresponding grooves near the ends of the two bands. The parts are similarly identified to correspond to Figure 2, and portions of the construction are omitted for clarity.

Each of the two styli follow paths which are circular arcs in traversing the record under control of the described linkage. Both of these arcs, extended, would pass through the spindle center S', and are of radius equivalent to R'W but are described about virtual centers displaced from R'; the virtual center for the outer stylus being displaced to the right of R' and the virtual center for the inner stylus being displaced to the left of R'. In effect, the path of each pickup is controlled as though each were connected to a separate virtual arm and control link, operating about virtual centers appropriate to the locations of the two pickups, and co-acting to produce the desired geometry. Similarly, if three or more pickups be mounted to the linkage as described, the single actual linkage effectively operates as three or more co-acting virtual linkages operating about virtual centers appropriate to the spacing of the several pickups.

Thus, the linkage as described is capable of guiding two pickups, which have initially been mounted a fixed distance apart and parallel to each other, in such fashion that the styli of both pickups remain in a single radial line at any instant and the axis of each pickup remains tangent to the respective groove at the point of the stylus at any instant, in their normal excursion across a record which has been recorded binaurally.

It will be noted that the line WX, in Figures 2 and 3, moves in the same manner as the corresponding line (EH, FJ or GK) in Figure 1, and the remarks anent the correspondence of this path to the circular arc produced by the linkage also applies here. In the practical case, however, in the presently standard binaural system, the module is such that the required excursion of the linkage during transcription is very much less than in the non-aural case; i. e. the angles $X_BP'X_E$ and $W_BR'W_E$ in Figure 3 are much less than the similar angles of excursion in Figure 1. Hence the theoretical departure of the lines UY and VZ (the pickup axes) from true tangency is of even lesser magnitude in the practical binaural case than in the practical monaural case, being of the order of 15" of arc in a typical embodiment. As has been stated, this is insignificant in the light of feasible tolerances of manufacture. Thus this invention provides true and continuous tangential contact, of two pickups mounted for binaural transcription with their appropriate record grooves; and also maintains the two pickups continuously in such relationship that their two styli are always on a single radial line and a fixed distance apart at any instantaneous position.

It may also be seen from Figures 2 and 3, and the description above, that the binaural tone arm in accordance with the described linkage may be employed to play a monaurally recorded record by merely engaging the inner pickup with the sound track, and allowing the inner pickup to make the full excursion across the record. In so doing, the practical design would provide means for locking the outer pickup up out of engagement with the grooves, and this may be incorporated in the mounting for providing vertical compliance elsewhere mentioned; but the means for so doing is not a part of this invention.

Although the linkage as shown and described has the arc path of the lower control point (W) passing through the spindle center (S), and the locus of the styli on the same radial line as the point W at any instant, and the line of control WX midway between the pickups and whereas this is the preferred geometry; the invention is not limited to this configuration, but includes arms wherein the lower control point makes an arc path not passing through the spindle center, and also may have the line of control not midway between the pickups, and the lower control point on a line other than the radial line joining the styli.

The preferred configuration of the pivot point W on the line between the two styli and midway thereon serves to eliminate any turning moments being developed about this pivot point by either stylus due to the lateral traversing force derived from the spiralled groove, inasmuch as the projected line of any such force passes through the pivot point. This desired condition also obtains when the inner pickup only is being employed to play back a monaural record. As stated elsewhere for the monaural tone arm, such moment is undesirable for the pickup function, but the property of the linkage for producing tangency and radial positioning of the two pickups is not vitiated by employment of such other configurations.

Another new and novel property of this linkage as compared with conventional binaural arms may be described by reference to Figures 2 and 3. A conventional binaural arm is constructed with both pickups fixed to a single rigid arm with their axes parallel and the proper distance apart, and with both axes offset at a fixed angle to the arm proper; as in the conventional monaural arm elsewhere described. With such a conventional binaural arm, the axes of both pickups can be tangent to their respective grooves at only one position in the traverse across the record; and at this position only, both styli are in a single radial line with the record spindle. At other positions on the record, the axes of both styli depart from tangency to their respective grooves; and at such positions the line between the styli, produced, does not pass through the spindle center, i. e. the styli are not on a radial line. Assume, in Figures 2 and 3, that the control link is omitted; and there is no pivoting of the pickups to the arm, i. e. axes UY and VZ make a fixed angle to the arm at all positions shown. Figure 2, then, may be considered as showing the one position at which both axes are tangent to their respective grooves, and both styli in a radial line. At this position, of course, the distance between the styli is equal to the module of the system. Now consider that Figure 3 shows two extreme positions where the departure from tangency is maximum, these being with the pickups at the outermost or innermost grooves of each band. At the outermost position, the axes $U_BY_B$ and $V_BZ_B$ will be less than tangent to their respective grooves; and the line $T_BU_BV_B$ through the actual stylus positions, produced, will in truth pass below the spindle center. In other words, the styli will be in the position of producing binaural phase distortion previously described. Similarly, at the innermost position, the axes will be greater than tangent to their respective grooves; and the line through the actual stylus positions will in truth pass above the spindle center. Now it may be seen that when the styli are at any of these positions departing considerably from the one position at which tangency is maintained, and the styli are not then both on a single radial line, but on a chordal line, then the actual linear distance between the instant positions of the two styli is greater than the module of the system. This is evident because the linear distance between correspondent points on corresponding grooves, measured on a radial line, is, of course, the module of the system and is a constant. Now the effect of this in a conventional binaural tone arm is to require that either or both of the pickups be mounted with a relatively large amount of damped lateral compliance, to permit the spacing between the styli to continuously change as the pickups traverse the binaural record; this change being a departure from the nominal module, first a maximum amount, diminishing through a zero amount, and again increasing to a maximum amount. Since the present invention maintains the styli always on a single radial line at any instant throughout the traverse of the record, the above source of necessity to provide for excessive lateral compliance of the pickups as a whole, is eliminated.

Figures 4, 5:
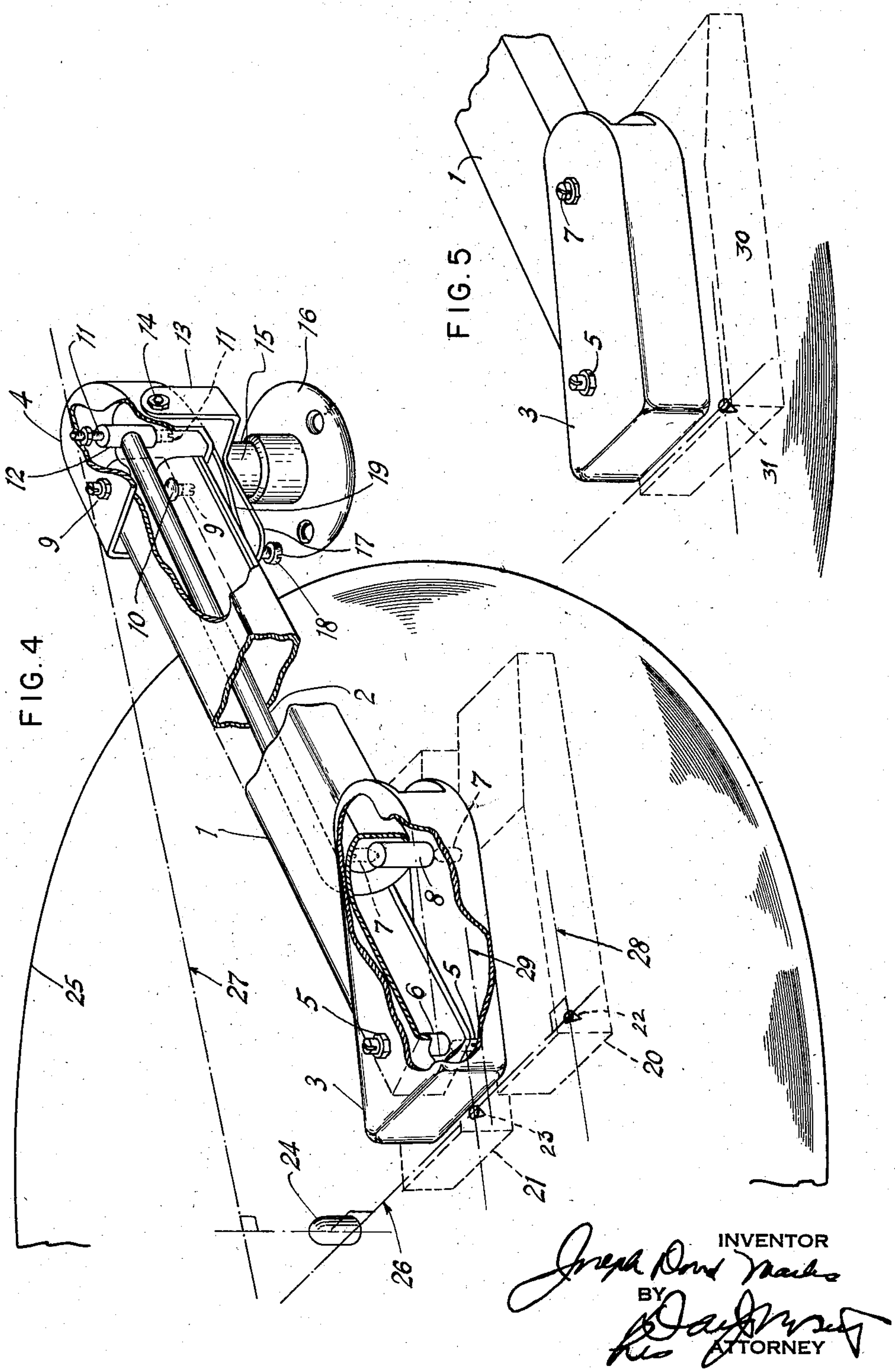
Fig. 4 is a perspective view of a binaural pickup mounting embodying the invention.
Fig. 5 is a partial perspective view of a monaural pickup assembly mounting embodying the invention.

Figure 4 is a general perspective view, partially cut away and in section, illustrating a typical commercial embodiment of the invention. Part 1 is an arm, of hollow rectangular cross-section as shown, open at one end and closed at the other end, the closed end being fashioned with a longitudinal portion removed therefrom for a distance from the closed end. Shown at 2 is a control link of round cross-section, which may be of tubing, having one end bent to a right-angle, and having rigidly fixed to both ends the cross members 8 and 12, each of round cross-section, and having their axes parallel to each other and at right angles to the plane of the bend in link 2, the whole being of such length and dimension that link 2 is contained within the hollow interior of arm 1, with the end 8 protruding from the cut-away portion at the forward part of arm 1, and the end 12 protruding from the rearward open end of the arm 1. Element 3 is a mounting member having a hollow rectangular cross-section, closed at its forward end and open at its rearward end and for a convenient distance along the sides near its rearward end, the whole being of such dimensions as to freely enshroud the forward cutaway end of arm 1 and the protruding end 8 on control link 2, and the length being such as to cover the cutaway portion of 1. Component 4 is a support member of hollow rectangular cross-section, open at its forward end and wholly closed at its rearward end in generally semi-circular planform, the whole being of such dimensions as to freely enshroud the open end of arm 1 and the protruding end 12 of control link 2.

The forward partially closed end of arm 1 is pivotally suspended within the forward portion of the hollow interior of member 3 by the two pivot assemblies 5, these being preferably cone-pivots or the like, operating within the bearing 6 affixed vertically within arm 1 at the proper point, the pivot assemblies being fixed into the upper and lower surfaces of member 3 at the proper points. The whole is arranged to permit only relative lateral rotation of arm 1 and member 3. The forward protruding end 8 of link 2 is pivotally suspended within the rearward portion of the hollow interior of member 3 by the two cone-pivot assemblies indicated by 7, operating within cone bearings fashioned into end 8, the pivot assemblies being fixed into the upper and lower surfaces of member 3 at the proper points. The whole is arranged to permit only relative lateral rotation of arm 2 and link 3.

The rearward open end of arm 1 is pivotally suspended within the forward portion of the hollow interior of 4 by the two cone-pivot assemblies 9, operating within bearings 10 bushed into the upper and lower surfaces of arm 1 at the proper points, the pivot assemblies being fixed into the upper and lower surfaces of member 4 at the proper points, the whole being arranged to permit only relative lateral rotation of arm 1 and member 4. The rearward protruding end 12 of link 2 is pivotally suspended within the rearward portion of the hollow interior of member 4 by the two cone-pivot assemblies 11, operating within cone bearings fashioned into end 12, the pivot assemblies being fixed into the upper and lower surfaces of member 4 at the proper points, the whole being arranged to permit only relative lateral rotation of arm 2 and member 4.

The axes of the four sets of pivots 5, 7, 9 and 11 are parallel to each other and at right angles to the plane of lateral rotation of the respective members, this plane being substantially parallel to the surface of the record in the playing position.

The support 4 is pivotally suspended within the yoke 13 by pivot assemblies 14, which may be plain bearing pivots engaging the sides of member 4, being arranged to permit vertical rotation of the whole structure about the axis of pivots 14 for the purpose of access to the cartridges or for other purposes. Yoke 13 is affixed to mounting post 15, which in turn is fastened within mounting base 16. Vertical adjustment of post 15 within base 16 may be provided for effecting parallel adjustment of the plane of operation of the linkage with the plane of the record, in conformity with the dimensions of the pickups employed; and slight lateral adjustment of post 15 within base 16 may be provided for effecting the required platform alignment of the system with respect to the record spindle during installation; but there is no freedom for support 4 or yoke 13 to rotate in a lateral plane during operation.

A portion 17 of yoke 13 extends forward longitudinally under the arm structure, bearing an adjustable screw 18 extending upward at its forward end. Another member, not shown, rigidly fixed to the underside of member 4 extends forward therefrom, above and parallel to portion 17, but clear of the underside of the arm 1. The forward end of this member, not shown, rests upon the upper end of screw 18 in such a manner that the weight of the arm and associated structure is born by the end of screw 18, and hence the arm structure is adjustably limited in its downward rotation about the axis of pivots 14. A leaf spring 19 is fastened at its rearward end to the yoke 13 and post 15, as by staking, and pierced at its forward end to surround screw 18 and move freely vertically thereon. Spring 19 is so fashioned that as the weight of the arm structure comes down upon screw 18, the greater part of this weight is born by the spring being deflected thereby and transmitted to the post 15, thus minimizing the pressure upon screw 18. Adjustment of screw 18 may be utilized in conjunction with vertical adjustment of 15 within 16, to just permit arm structure to assume a position substantially parallel to the plane of the record in a particular installation.

Referring to Figure 4, there is indicated schematically at 20 and 21 the outlines of two pickup mountings, below the member 3, arranged to mount two conventional pickups for binaural playback. Mountings 20 and 21 are fastened to the underside of member 3 by a suitable connection, not indicated in detail here, designed as required to provide limited vertical compliance for the pickups at the rated stylus pressure, and incorporating limited lateral compliance as needed to compensate for variables in record manufacture. Mountings 20 and 21 are effectively fixed to member 3 in such fashion that the styli 22 and 23 are at a distance apart equal to the module of the record system, and equidistant from a plane through the pivots 5 and 7, and the pickups are effectively fixed in mountings 20 and 21 so that the axes of the pickups 28 and 29 are parallel to each other and to the plane through the pivots 5 and 7. In the preferred embodiment, the styli 22 and 23 also lie in a plane including pivots 5 and at right angles to the plane through pivots 5 and 7.

The figure also indicates the record spindle 24 and the outline of the record 25, and line 26 illustrates the radial line from the spindle thru the styli 22 and 23. Line 27 illustrates that a plane through pivots 9 and 11 also passes through the record spindle 24.

The correspondence between the elements of Figure 4 and the geometry of Figures 1 and 2 is evident, and will not be delineated. Note, however, that in the embodiment shown in Figure 4, the control link 2, corresponding to P'X of Figure 2, is so contrived that its excursion with respect to the arm 1 in traversing from the outer to the inner grooves of the record is wholly housed within the interior of 1; and that by this artifice there is no linkage apparent externally, and the relative movements of the members is not readily discernible in normal operation. Of course, close scrutiny will disclose the angular displacements of the members with respect to one another. The design shown provides a neat embodiment of the invention, not readily subject to derangement which might be possible if the linkage were external.

A monaural pickup arrangement is schematically indicated in Fig. 5 as including a mounting 30 fastened to the underside of member 3 by suitable means, not shown, and designed, in the usual manner, to provide limited vertical compliance for the rated stylus pressure and to compensate for variables in record manufacture. A stylus 31 is mounted in member 30 for oscillation about an axis extending through pivots 5 and 7 and parallel to the record surface, and preferably is located beneath pivot 5.

As elsewhere mentioned, the design of Figure 4 can also be mounted with three or more pickups affixed under member 3, in conformity to the design of the multiple track system employed; further it is within the province of the invention to mount on the underside of member 5, a single pickup unit with two or more styli, the respective styli moving in correspondence with spaced sound tracks.

While a specific embodiment of the invention has been shown and described in detail to illustrate the application of the invention principles, it will be understood that the invention may be embodied otherwise without departing from such principles.

I claim:

1. In combination with a phonograph record turntable mounted for rotation about a spindle axis and arranged to support a record having a spiral groove sound track, and a stylus arranged to engage the record groove and mounted for oscillation in accordance with undulations in the sound track; a tone arm mounted to swing over the turntable about a fixed pivot perpendicular to the turntable; a member pivotally mounted on the free end of said tone arm for swinging movement in a plane parallel to the turntable; said member mounting the stylus for such oscillation and the stylus, during swinging movement of the tone arm, during its oscillation, moving along an arc, and a control link swingably connected to a first pivot perpendicular to the turntable fixed relative to the fixed pivot of said tone arm and a second pivot perpendicular to the turntable fixed to said member; said second pivot intersecting a tangent to the record groove at the instantaneous point of contact of the stylus with the record groove in at least three positions of the stylus along the sound track; the location of said first pivot being the center of a circle passing through each of said tangents at points equidistant inwardly along said tangents toward said fixed pivot from the intersections of said tangents with the arc of movement of the stylus.

2. In combination with a phonograph record turntable mounted for rotation about a spindle axis and arranged to support a record having a spiral groove sound track, and a stylus arranged to engage the record groove and mounted for oscillation about an axis parallel to the turntable in accordance with lateral undulations in the sound track; a tone arm mounted to swing over the turntable about a fixed pivot; perpendicular to the turntable; a member pivotally mounted on the free end of said tone arm for swinging movement in a plane parallel to the turntable; said member mounting the stylus for such oscillation and the stylus, during swinging of the tone arm, moving along an arc, the pivotal connection of said member to said tone arm being in substantial alignment with the stylus; and a control link swingably connected to a first pivot perpendicular to the turntable fixed relative to the fixed pivot of said tone arm and a second vertical pivot fixed to said member; said second pivot intersecting a tangent to the record groove at the instantaneous point of contact of the stylus with the record groove in at least three positions of the stylus along the sound track; the location of said first pivot being the center of a circle passing through each of said tangents at points equidistant inwardly along said tangents toward said fixed pivot from the intersections of said tangents with the arc of movement of the stylus.

3. In combination with a phonograph record turntable mounted for rotation about a spindle axis and arranged to support a record having a spiral groove sound track, and a stylus arranged to engage the record groove and mounted for oscillation about an axis parallel to the turntable in accordance with lateral undulations in the sound track; a tone arm mounted to swing over the turntable about a fixed pivot perpendicular to the turntable; a member pivotally mounted on the free end of said tone arm for swinging movement in a plane parallel to the turntable; said member mounting the stylus for such oscillation and the stylus, during swinging of the tone arm, moving along an arc intersecting the spindle axis; and a control link swingably connected to a first pivot perpendicular to the turntable fixed relative to the fixed pivot of said tone arm and a second pivot perpendicular to the turntable fixed to said member; said first pivot, the fixed pivot of the tone arm, and the spindle axis lying in a common plane; said second pivot intersecting a tangent to the record groove at the instantaneous point of contact of the stylus with the record groove in at least three positions of the stylus along the sound track; the location of said first pivot being the center of a circle passing through each of said tangents at points equidistant inwardly along said tangents toward said fixed pivot from the intersections of said tangents with the arc of movement of the stylus.

4. In combination with a phonograph record turntable mounted for rotation about a spindle axis and arranged to support a record having a spiral groove sound track, and a stylus arranged to engage the record groove and mounted for oscillation about an axis parallel to the turntable in accordance with lateral undulations in the sound track; a tone arm mounted to swing over the turntable about a fixed pivot perpendicular to the turntable; a member pivotally mounted on the free end of said tone arm for swinging movement in plane parallel to the turntable; said member mounting the stylus for such oscillation and the stylus, during swinging of the tone arm, moving along an arc intersecting the spindle axis, the pivotal connection of said member to said tone arm being in substantial alignment with the stylus; and a control link swingably connected to a first pivot perpendicular to the turntable fixed relative to the fixed pivot of said tone arm and a second pivot perpendicular to the turntable fixed to said member; said first pivot, the fixed pivot of the tone arm, and the spindle axis lying in a common plane; said second pivot intersecting a tangent to the record groove at the instantaneous point of contact of the stylus with the record groove in at least three positions of the stylus along the sound track; the location of said first pivot being the center of a circle passing through each of said tangents at points equidistant inwardly along said tangents toward said fixed pivot from the intersections of said tangents with the arc of movement of the stylus.

5. In combination with a phonograph record turntable mounted for rotation about a spindle axis and arranged to support a record having a spiral groove sound track, and a stylus arranged to engage the record groove and mounted for oscillation about an axis parallel to the turntable in accordance with lateral undulations in the sound track; a tone arm mounted to swing over the turntable about a fixed pivot perpendicular to the turntable; a member pivotally mounted on the free end of said tone arm for swinging movement in a plane parallel to the turntable; said member mounting the stylus for such oscillation and the stylus, during swinging of the tone arm, moving along an arc intersecting the spindle axis; and a control link swingably connected to a first pivot fixed relative to the fixed pivot perpendicular to the turntable of said tone arm and a second pivot perpendicular to the turntable fixed to said member; said first pivot, the fixed pivot of the tone arm, and the spindle axis lying in a common plane; said second pivot intersecting a tangent to the record groove at the instantaneous point of contact of the stylus with the record groove in at least three positions of the stylus along the sound track, such tangent and the axis of oscillation of the stylus lying in a common plane; the location of said first pivot being the center of a circle passing through each of said tangents at points equidistant inwardly along said tangents toward said fixed pivot from the intersections of said tangents with the arc of movement of the stylus.

6. In combination with a phonograph record turntable mounted for rotation about a spindle axis and arranged to support a record having a spiral groove sound track, and a stylus arranged to engage the record groove and mounted for oscillation about an axis parallel to the turntable in accordance with lateral undulations in the sound track; a tone arm mounted to swing over the turntable about a fixed pivot perpendicular to the turntable; a member pivotally mounted on the free end of said tone arm for swinging movement in a plane parallel to the turntable; said member mounting the stylus for such oscillation and the stylus, during swinging of the tone arm, moving along an arc intersecting the spindle axis; and a control link swingably connected to a first fixed pivot perpendicular to the turntable fixed relative to the vertical pivot of said tone arm and a second pivot perpendicular to the turntable fixed to said member; said first pivot, the fixed pivot of the tone arm, and the spindle axis lying in a common plane; said second pivot intersecting a tangent to the record groove at the instantaneous point of contact of the stylus with the record groove in a plurality of positions of the stylus along the sound track; said first pivot comprising the center of a circle constructed from points on such tangents each equidistant from the point of contact of the stylus with the record groove.

7. In combination with a phonograph record turntable mounted for rotation about a spindle axis and arranged to support a record having at least a pair of spiral groove sound tracks and at least a pair of styli each arranged to engage a different one of the record grooves of the respective tracks and each mounted for oscillation in accordance with undulations in the grooves of each sound track; a tone arm mounted to swing over the turntable about a fixed pivot perpendicular to said turntable; a member pivotally mounted on the free end of said tone arm for swinging movement in a plane parallel to the turntable; said member mounting the styli for independent oscillation about parallel axes spaced apart in accordance with the radial spacing of the respective sound tracks, during swinging of the tone arm, each stylus moving along an arc intersecting the spindle axis; the pivotal connection of said member to said tone arm intersecting a radius common to said styli and the spindle axis; and a control link swingably connected to a first pivot perpendicular to the turntable fixed relative to the fixed pivot of said tone arm and a second pivot perpendicular to the turntable fixed to said member; said second pivot intersecting a tangent to a record groove at the instantaneous point of contact of a stylus with a record groove in at least three positions of the styli along the sound tracks; the location of said first pivot being the center of a circle passing through each of said tangents at points equidistant inwardly along said tangents toward said fixed pivot from the intersections of said tangents with the arc of movement of a stylus.

8. In combination with a phonograph record turntable mounted for rotation about a spindle axis and arranged to support a record having at least a pair of spiral groove sound tracks, and at least a pair of styli each arranged to engage a different one of the record grooves of the respective tracks and each mounted for oscillation in accordance with undulations in the grooves of each sound track; a tone arm mounted to swing over the turntable about a fixed pivot perpendicular to said turntable; a member pivotally mounted on the free end of said tone arm for swinging movement in a plane parallel to the turntable; said member mounting the styli for independent oscillation about parallel axes spaced apart in accordance with the radial spacing of the respective sound tracks, during swinging of the tone arm, each stylus moving along an arc intersecting the spindle axis; and a control link swingably connected to a first pivot perpendicular to the turntable fixed relative to the fixed pivot of said tone arm and a second vertical pivot fixed to said member, and intersecting a line parallel to tangents to the record grooves at the instantaneous points of contact of the styli with the record grooves and between the styli axes of oscillation in all positions of the styli along the sound tracks; the location of said first pivot being the center of a circle passing through each of said tangents at points equidistant inwardly along said tangents toward said fixed pivot from the intersections of said tangents with the arc of movement of a stylus.

9. In combination with a phonograph record turntable mounted for rotation about a spindle axis and arranged to support a record having at least a pair of spiral groove sound tracks, and at least a pair of styli each arranged to engage a different one of the record grooves of the respective tracks and each mounted for oscillation in accordance with undulations in the groove of each sound track; a tone arm mounted to swing over the turntable about a fixed pivot perpendicular to said turntable; a member pivotally mounted on the free end of said tone arm for swinging movement in a plane parallel to the turntable; said member mounting the styli for independent oscillation about parallel axes spaced apart in accordance with the radial spacing of the respective sound tracks, each stylus during swinging of the tone arm moving along an arc intersecting the spindle axis; and a control link swingably connected to a first pivot perpendicular to said turntable fixed relative to the fixed pivot of said tone arm and a second vertical pivot fixed to said member, and intersecting a line parallel to tangents to the record grooves at the instantaneous points of contact of the styli with the record grooves, and midway between the styli axes of oscillation in at least three positions of the styli along the sound track; the location of said first pivot being the center of a circle passing through each of said tangents at points equidistant inwardly along said tangents toward said fixed pivot from the intersections of said tangents with the arc of movement of a stylus.

10. In combination with a phonograph record turntable mounted for rotation about a spindle axis and arranged to support a record having at least a pair of spiral groove sound tracks, and at least a pair of styli each arranged to engage a different one of the record grooves of the respective tracks and each mounted for oscillation in accordance with undulations in the grooves of each sound track; a tone arm mounted to swing over the turntable about a fixed pivot perpendicular to said turntable; a member pivotally mounted on the free end of said tone arm for swinging movement in a plane parallel to said turntables; said member mounting the styli for independent oscillation about parallel axes spaced apart in accordance with the radial spacing of the respective sound tracks, each stylus during swinging of the tone arm moving along an arc intersecting the spindle axis; the pivotal connection of said member to said tone arm intersecting a radius common to said styli and the spindle axis, and moving along an arc intersecting the spindle axis; and a control link swingably connected to a first pivot perpendicular to said turntable fixed relative to the fixed pivot of said tone arm and a second pivot perpendicular to said turntable fixed to said member, and intersecting a line parallel to tangents to the record grooves at the instantaneous points of contact of the styli with the record grooves and perpendicular to such radius, and between the styli axes of oscillation in at least three positions of the styli along the sound tracks; the location of said first pivot being the center of a circle passing through each of said tangents at points equidistant inwardly along said tangents toward said fixed pivot from the intersections of said tangents with the arc of movement of a stylus.

11. In combination with a phonograph record turntable mounted for rotation about a spindle axis and arranged to support a record having at least a pair of spiral groove sound tracks, and at least a pair of styli each arranged to engage a different one of the record grooves of the respective tracks and each mounted for oscillation in accordance with undulations in the grooves of the sound track; a tone arm mounted to swing over the turntable about a fixed pivot perpendicular to said turntable; a member pivotally mounted on the free end of said tone arm for swinging movement in a plane parallel to said turntable; said member mounting the styli for independent oscillation about parallel axes spaced apart in accordance with the radial spacing of the respective sound tracks, each stylus during swinging of the tone arm, moving along an arc intersecting the spindle axis, the pivotal connection of said member to said tone arm intersecting a radius common to said styli and the spindle axis midway between the styli, and moving along an arc intersecting the spindle axis; and a control link swingably connected to a first pivot perpendicular to said turntable fixed relative to the fixed pivot of said tone arm and a second pivot perpendicular to said turntable fixed to said member, and intersecting a line parallel to tangents to the record grooves at the instantaneous points of contact of the styli with the record grooves perpendicular to such radius, and midway between the styli axes of oscillation in at least three positions of the styli along the sound track; the location of said first pivot being the center of a circle passing through each of said tangents at points equidistant inwardly along said tangents toward said fixed pivot from the intersections of said tangents with the arc of movement of a stylus.

12. In combination with a phonograph record turntable mounted for rotation about a spindle axis and arranged to support a record having at least a pair of spiral groove sound tracks, and at least a pair of styli each arranged to engage a different one of the record grooves of the respective tracks and each mounted for oscillation in accordance with undulations in the groove of each sound track; a tone arm mounted to swing over the turntable about a fixed pivot perpendicular to said turntable; a member pivotally mounted on the free end of said tone arm for swinging movement in a plane parallel to said turntable; said member mounting the styli for independent oscillation about parallel axes spaced apart in accordance with the radial spacing of the respective sound tracks, each stylus during swinging of the tone arm, moving along an arc intersecting the spindle axis, the pivotal connection of said member to said tone arm intersecting a radius common to said styli and the spindle axis midway between the styli, and moving along an arc intersecting the spindle axis; and a control link swingably connected to a first pivot perpendicular to said turntable fixed relative to the fixed pivot of said tone arm and a second pivot perpendicular to said turntable fixed to said member, and intersecting a line parallel to tangents to the record grooves at the instantaneous points of contact of the styli with the record grooves perpendicular to such radius, and horizontally midway between the styli axes of oscillation in at least three positions of the styli along the sound track; the location of said first pivot being the center of a circle passing through each of said tangents at points equidistant inwardly along said tangents toward said fixed pivot from the intersections of said tangents with the arc of movement of a stylus.

References Cited in the file of this patent

UNITED STATES PATENTS

| | | |
|---|---|---|
| 1,438,642 | Graham | Dec. 12, 1922 |
| 2,522,997 | Coppleman | Sept. 19, 1950 |

FOREIGN PATENTS

| | | |
|---|---|---|
| 398,262 | Great Britain | Sept. 14, 1933 |
| 728,245 | France | July 2, 1932 |